United States Patent
Wiedeman et al.

[19]

[11] Patent Number: 6,134,423

[45] Date of Patent: *Oct. 17, 2000

[54] SATELLITE COMMUNICATIONS SYSTEM HAVING GATEWAY-BASED USER RF EXPOSURE MONITORING AND CONTROL

[75] Inventors: Robert A. Wiedeman, Los Altos; Paul A. Monte, San Jose; Michael J. Sites, Fremont, all of Calif.

[73] Assignee: Globalstar L.P., San Jose, Calif.

[*] Notice: This patent is subject to a terminal disclaimer.

[21] Appl. No.: 08/996,932

[22] Filed: Dec. 23, 1997

Related U.S. Application Data

[63] Continuation of application No. 08/502,151, Jul. 13, 1995, Pat. No. 5,802,445.

[51] Int. Cl.⁷ ............................................ H04B 7/185
[52] U.S. Cl. ..................... 455/117; 455/405; 455/427; 455/13.4; 455/522; 455/67.1; 455/26.1; 455/92; 340/600
[58] Field of Search ............................... 455/12.1, 13.4, 455/26.1, 427, 423, 405, 522, 67.1, 69, 561, 572, 575, 91, 92, 127, 117; 340/600

[56] References Cited

U.S. PATENT DOCUMENTS

| | | | |
|---|---|---|---|
| Re. 32,905 | 4/1989 | Baran | 370/104 |
| 4,901,307 | 2/1990 | Gilhousen et al. | 370/18 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |

(List continued on next page.)

FOREIGN PATENT DOCUMENTS

| | | |
|---|---|---|
| 0 421 698 A3 | 10/1991 | European Pat. Off. |
| 0 637 142 A1 | 2/1995 | European Pat. Off. |
| WO 90/13186 | 11/1990 | WIPO |
| WO 91/09473 | 6/1991 | WIPO |
| WO 95/03549 | 2/1995 | WIPO |
| WO95/03549 | 2/1995 | WIPO |

OTHER PUBLICATIONS

"Globalstar*: a Transparent System", D. Rouffet, Electrical Communication (1993) 1st Quarter, pp. 84–90.

"Current and Future Mobile Satellite Communication Systems" Kato et al., IEICE Transactions, Aug. 8, 1991, pp. 2201–2210, vol. E 74, No. 8, Aug. 1991.

(List continued on next page.)

*Primary Examiner*—Fan Tsang
*Assistant Examiner*—Philip J. Sobutka
*Attorney, Agent, or Firm*—Ohlandt, Greeley, Ruggiero & Perle, L.L.P.

[57] ABSTRACT

A method and system wherein a system gateway (18) determines, from closed loop power control information, a power density at an antenna (13a) of a user terminal 13. The gateway also maintains a record of a duration of time that the power density exceeds a specified threshold. The gateway determines if an averaged transmitted power density associated with the antenna of the user terminal will equal or exceed at least one of a predetermined threshold level, within a specified period of time, or an absolute threshold level. If the gateway determines that a threshold will probably be exceeded if the call connection is maintained, the gateway terminates the connection prior to a time that the user terminal averaged transmitted power density level equals or exceeds the predetermined or absolute threshold level. A tone or a visual indicator may be employed to warn the user that a current connection or call will be terminated. Provisions are made for allowing predetermined types of calls (e.g., emergency calls) to be made during a cutoff period wherein the user terminal is prohibited from placing further calls. It within the scope of the invention to perform the power density monitoring function also within the user terminal. In this case information may be transferred to the GW over a return link, and majority voting or some other technique can be employed by the GW before terminating the connection. In this case the power density determination made at the GW has priority over that made in the user terminal to prevent a user terminal from intentionally or inadvertently defeating the power density monitoring function.

7 Claims, 6 Drawing Sheets

U.S. PATENT DOCUMENTS

| | | | |
|---|---|---|---|
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,243,911 | 9/1993 | Dow et al. | 102/202.2 |
| 5,265,119 | 11/1993 | Gilhousen et al. | 375/1 |
| 5,303,286 | 4/1994 | Wiedeman | 379/59 |
| 5,339,330 | 8/1994 | Mallinckrodt | 375/1 |
| 5,388,147 | 2/1995 | Grimes | 379/59 |
| 5,410,728 | 4/1995 | Bertiger et al. | 455/13.1 |
| 5,415,368 | 5/1995 | Horstein et al. | 244/354 |
| 5,422,647 | 6/1995 | Hirshfield et al. | 342/354 |
| 5,428,815 | 6/1995 | Grube | 455/33.1 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |
| 5,483,673 | 1/1996 | Hiben et al. | 455/33.1 |
| 5,524,275 | 6/1996 | Lindell | 455/117 |
| 5,526,528 | 6/1996 | Kurisu | 455/117 |
| 5,802,445 | 9/1998 | Wiedemann et al. | 455/12.1 |

OTHER PUBLICATIONS

"Iridium*:Key to Worldwide Cellular Communications", Jim Foley, Telecommunications, Oct., 1991, 4 pages.

Portion of Application of Loral Cellular Systems, Corp., before the Federal Communications Commission, Washington, D.C., Jun. 3, 1991, Globalstar, pp. 94–187.

Portion of Application of Ellipsat Corporation, before the Federal Communications Commission, Washington, D.C., pp. 5–34, Nov. 2, 1990.

"An Integrated Satellite–Cellular Land Mobile System for Europe", E. Del Re, University of Florence, Dept. of Electronics Engineering, italy, Sep. 21, 1989.

"Digital Network Oriented Mobile Satellite System as an Integrated Part of the GSM Cellular Radio System in Europe", P. Dondl, Deutsch BUndespost/Fernmeldetechniches Zentralmt/Darmstadt, Fed. Rep. Germ. Sep. 21,1989.

"The OmniTRACS Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System ODYSSEY$^{SM}$ before the FCC, Washington, D.C. 20554, May 31, 1991 pp. 33–51.

"Increased Capacity Using CDMA for Mobile Satellite Communication", K.Gilhousen et al., IEEE Journal on Selected Areas in Communications, vol. 8, No. 4, May 1990, pp. 503–514.

"The Iridium System—A Revolutionary Satellite Communications System Developed with Innovative Applications of Technology", D. Sterling et al., IEEE, MILCOM Nov. 4–7, 1991.

SATELLITE COMMUNICATIONS SYSTEM HAVING GATEWAY-BASED USER RF EXPOSURE MONITORING AND CONTROL

This application is a continuation of application Ser. No. 08/502,151 filed on Jul. 13, 1995, now U.S. Pat. No. 5,802,445.

FIELD OF THE INVENTION

This invention relates generally to communications systems and, in particular, to satellite communications systems wherein a plurality of user terminals are in bi-directional wireless communication with a terrestrial communications network via a gateway and at least one satellite.

BACKGROUND OF THE INVENTION

Existing regulations specify a total amount of exposure to RF energy, above a threshold power density, that a user of a wireless terminal can be exposed to within a predetermined interval of time (e.g., averaged over one half hour).

One technique to determine the user's exposure would be to monitor the radiated power within the user's terminal and average over time the radiated power that exceeds the threshold. If the threshold level is exceeded within the specified interval of time, the user terminal could be rendered inoperable, thereby removing the user from the transmitted RF energy.

However, this approach could result in user terminals being modified or manufactured so as to defeat this function. Although the convenience to the user of always having the terminal available for use could be assured, the user may be exposed to potentially harmful levels of RF energy.

Furthermore, a user terminal that is manufactured to operate with a specified allowable average power density could be rendered obsolete if the threshold level is later changed. As such, providing this function in the user terminal has a number of drawbacks.

OBJECTS OF THE INVENTION

It is a first object of this invention to provide a method and system for remotely monitoring a user's exposure to transmitted RF energy, and for terminating a connection or call if the user's exposure will exceed a predetermined threshold limit.

It is a further object of this invention to provide a method and system for refusing service to a user terminal identified as one which may cause a user to experience exposure to RF energy that would exceed a specified threshold amount.

SUMMARY OF THE INVENTION

The foregoing and other problems are overcome and the objects of the invention are realized by a method wherein a system gateway (GW) determines, from closed loop power control information, a power density at an antenna of a user terminal. The GW also maintains a record of a duration of time that the power density exceeds a specified threshold. The GW determines if an averaged transmitted power density associated with the antenna of the user terminal will equal or exceed at least one of a predetermined threshold level, within a specified period of time, or an absolute threshold level. If the GW determines that a threshold will probably be exceeded if the call connection is maintained, the GW terminates the connection prior to a time that the user terminal averaged transmitted power density level equals or exceeds the predetermined or absolute threshold level.

If it becomes apparent that an over-threshold amount of exposure will occur, the GW preferably informs the user via a tone or a visual indicator that a current connection or call will be terminated. Thereafter, and assuming that the user is still connected, the GW automatically terminates the connection, and refuses to service the user again until after enough time has elapsed so that the exposure threshold will not be immediately exceeded. Provisions are made for allowing predetermined types of calls (e.g., emergency calls) to be made during the cutoff period.

It within the scope of the invention to perform the power density monitoring function also within the user terminal. In this case information may be transferred to the GW over a return link, and majority voting or some other technique can be employed by the GW before terminating the connection. In this case the power density determination made at the GW has priority over that made in the user terminal to prevent a user terminal from intentionally or inadvertently defeating the power density monitoring function. The monitoring function may also be performed in whole or in part within the satellite.

This invention thus pertains, in a preferred but not limiting embodiment, to a satellite communication system that includes at least one earth orbiting satellite, at least one terrestrially located user terminal, and at least one terrestrially located gateway. The gateway includes circuits and the like for conveying a bidirectional wireless communication connection between a terrestrial communications system and the at least one user terminal through the at least one satellite. At least one of the at least one gateway, the at least one satellite, and the at least one user terminal includes circuitry and the like for determining, at least during a connection, if an RF exposure of a user associated with the terminal will equal or exceed a threshold level. Also provided is a mechanism for controlling the wireless connection to prevent an RF exposure of the user from equaling or exceeding the threshold level.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
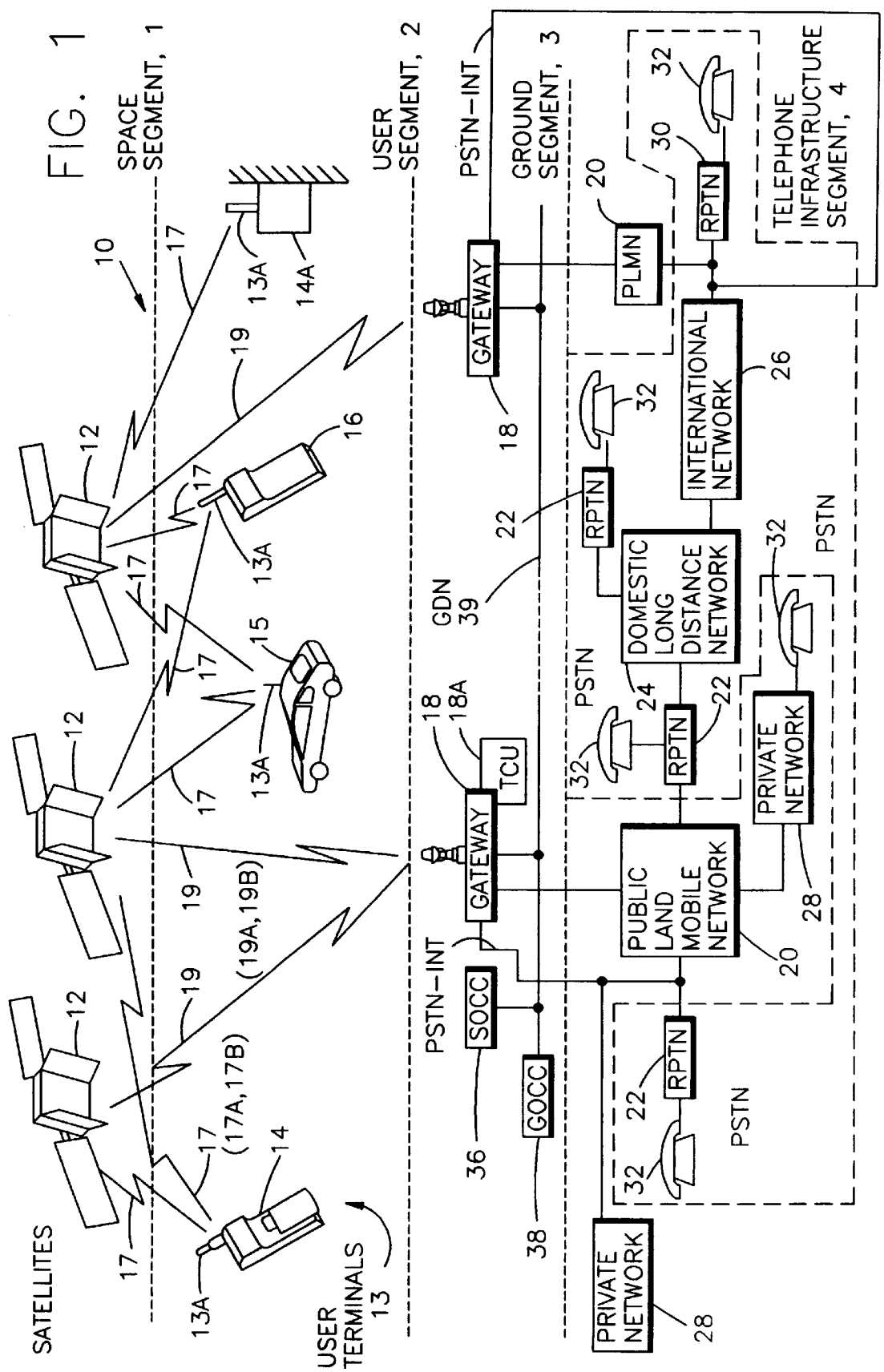
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communications system 10 may be conceptually subdivided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radiotelephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
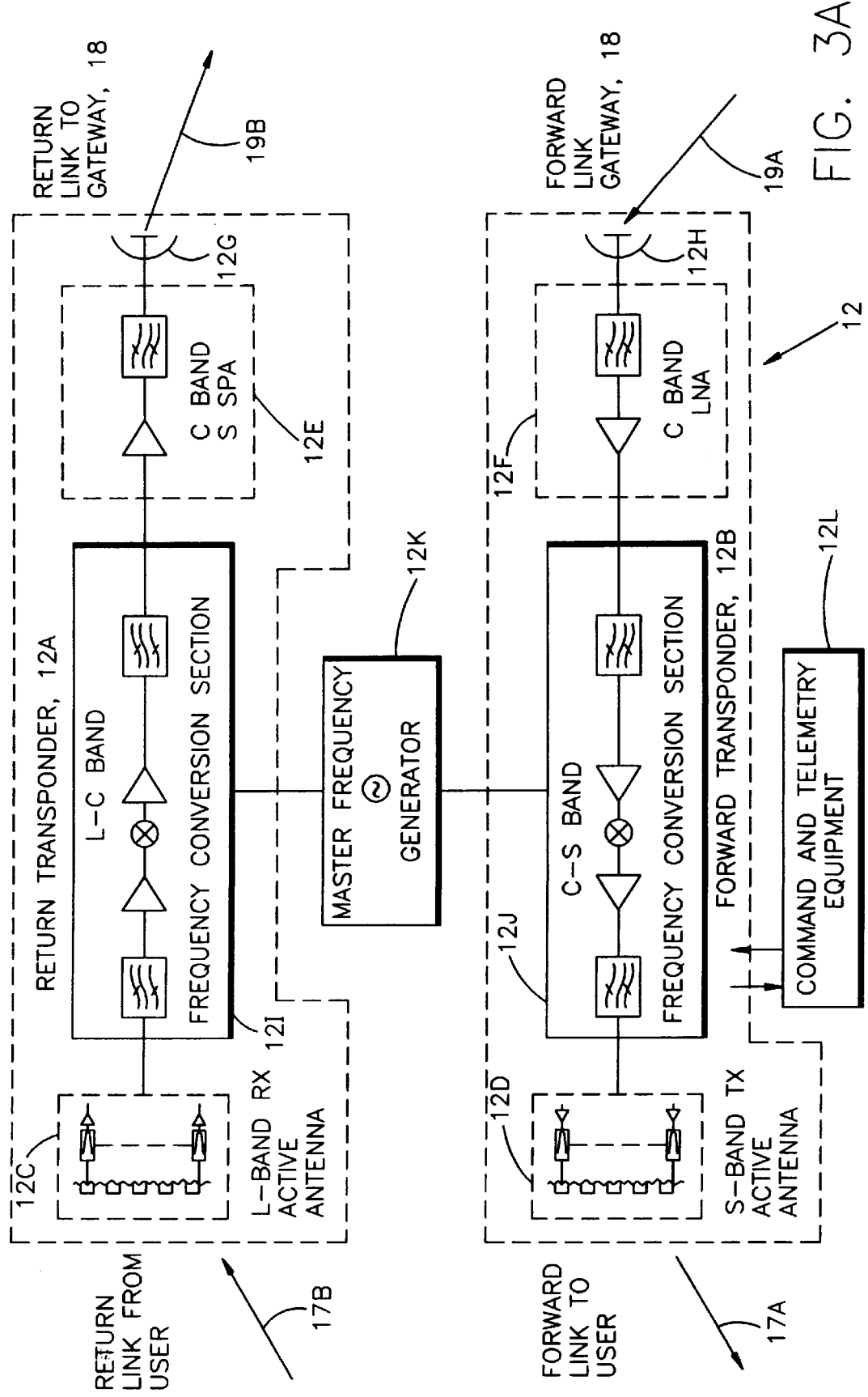
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 110°. This yields a coverage zone that is approximately 3600 miles in diameter.

Figure 3B:
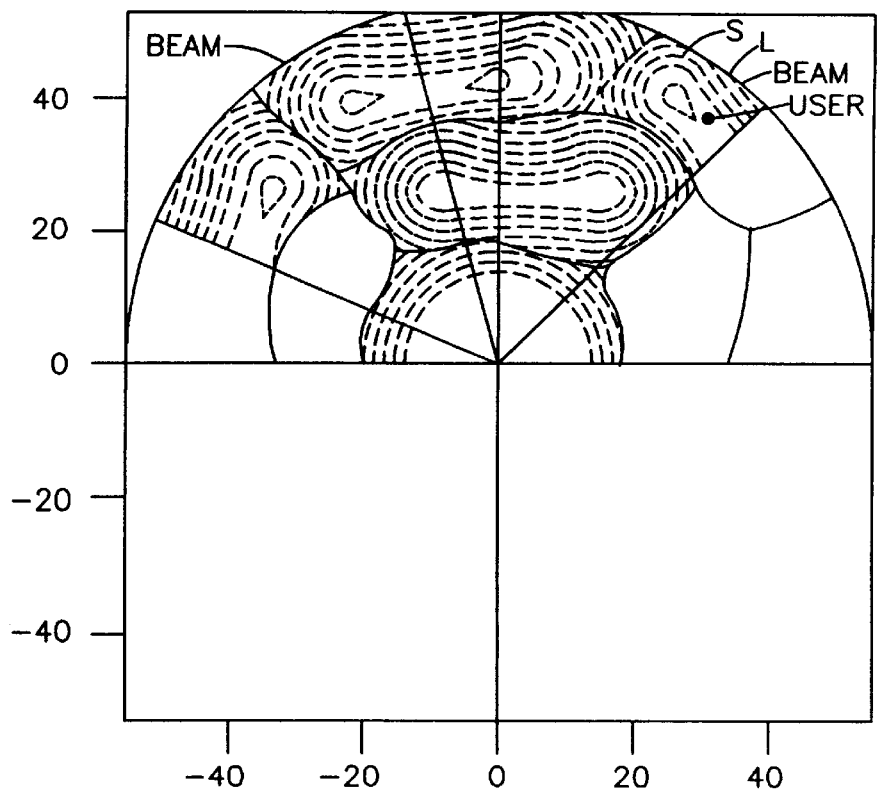
FIG. 3B illustrates a portion of a beam pattern that is associated with one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite Payload", which discloses one type of communications satellite payload that is suitable for use with the teaching of this invention.

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
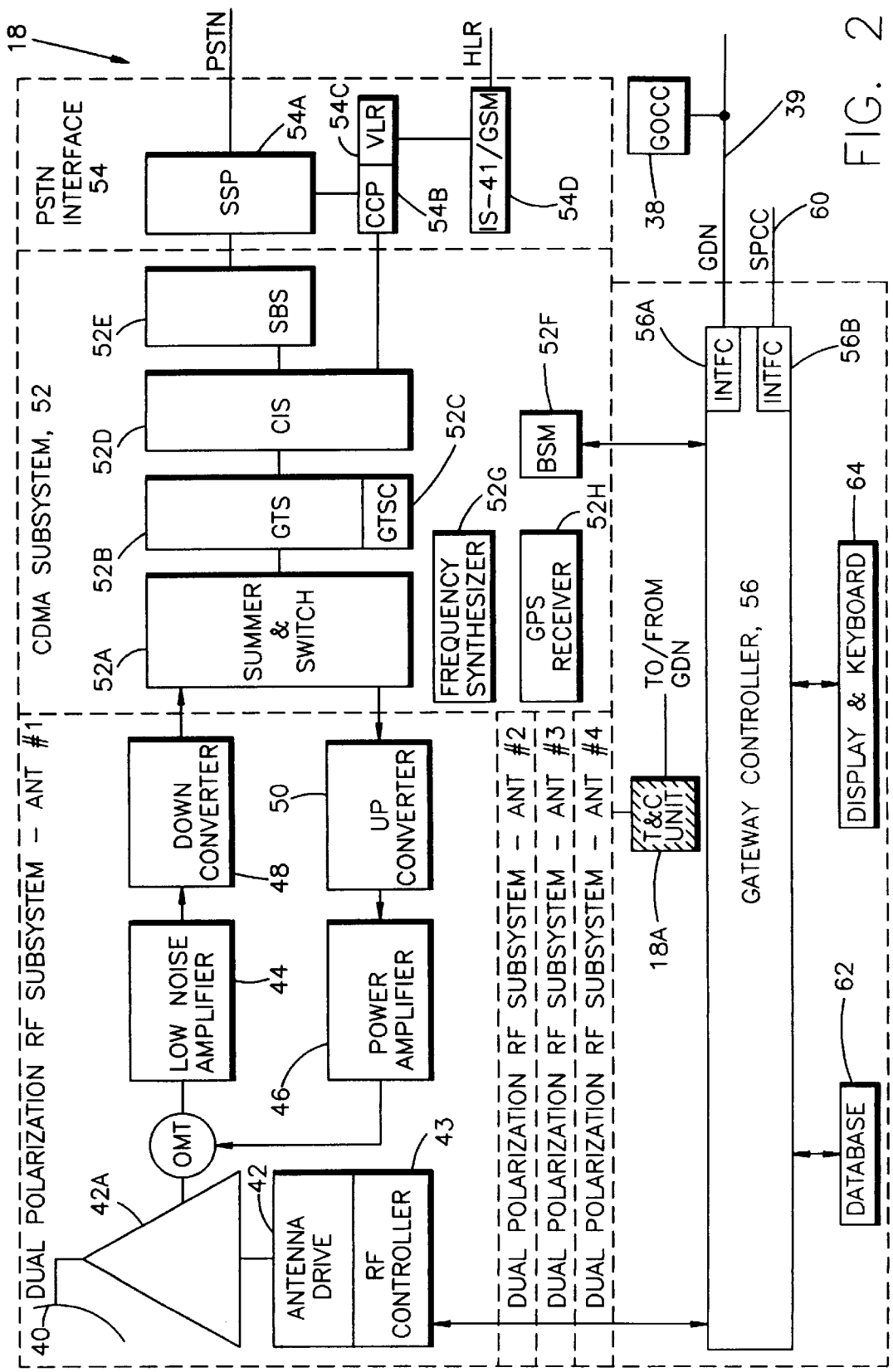
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA subsystem 52 is controlled by a Base Station Manager (BSM) 52f and functions in a manner similar to a CDMA-compatible (for example, an IS-95 compatible) base station. The CDMA subsystem 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI), or other suitable means. The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA subsystem 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Figure 4:
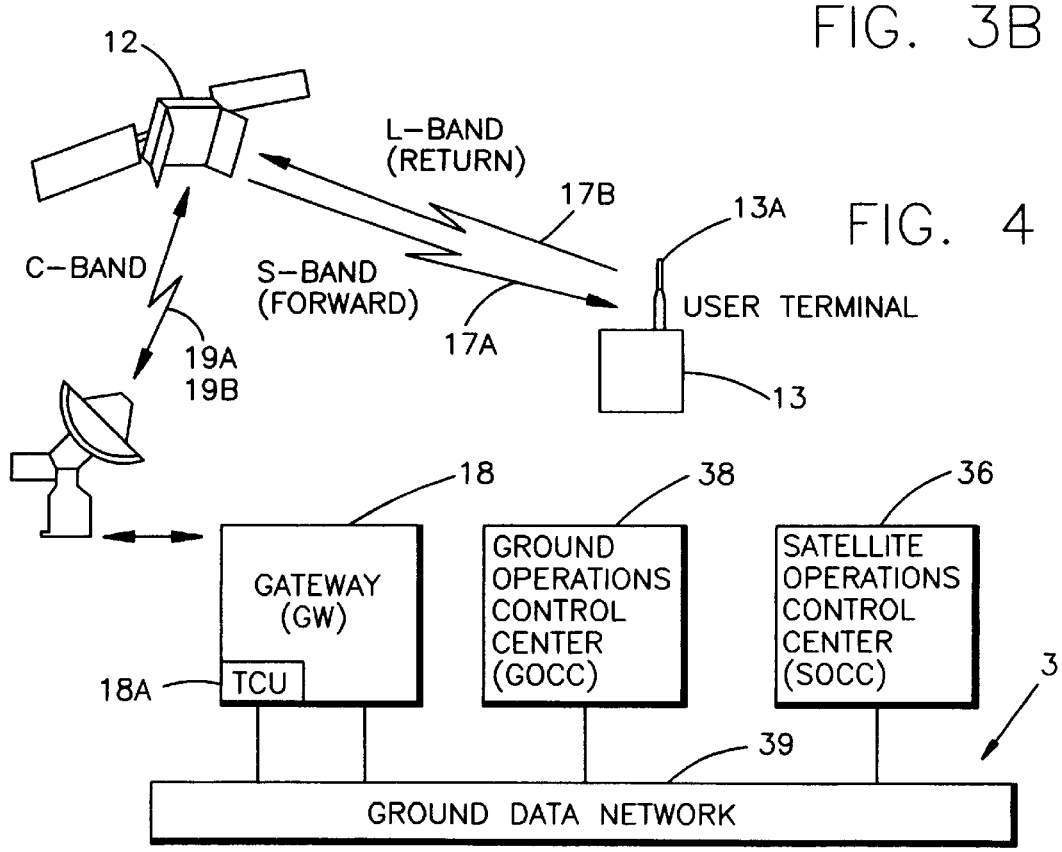
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
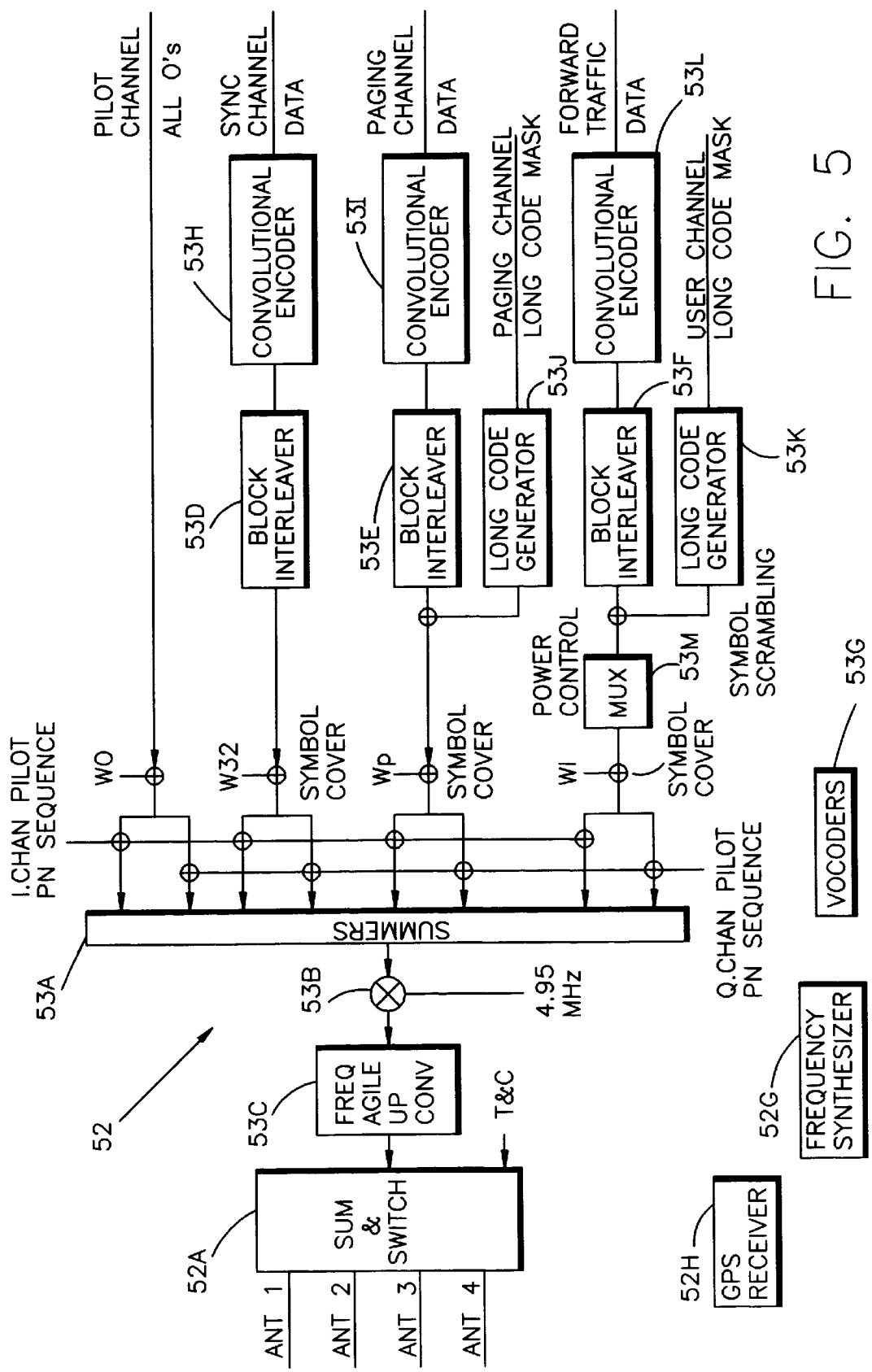
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA FD RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK or BPSK spread across the CDMA FD RF channel bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53k encodes the voice into a PCM forward traffic data stream. The forward traffic data stream is applied to a convolutional encoder 53l where it is convolutionally encoded and then block interleaved in block 53f. The resulting data stream is combined with the output of a user long code block 53k. The user long code is employed to separate different subscriber channels. The resulting data stream is then power controlled in multiplexer (MUX) 53m, modulo two added to the Walsh code, and then QPSK or BPSK spread across the CDMA FD RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53e, 53i, 53j) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communications using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce correlation, and thus interference, between return traffic channels. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a description of a presently preferred embodiment of the communication system 10. A description is now made of presently preferred embodiments of the present invention.

Figure 6:
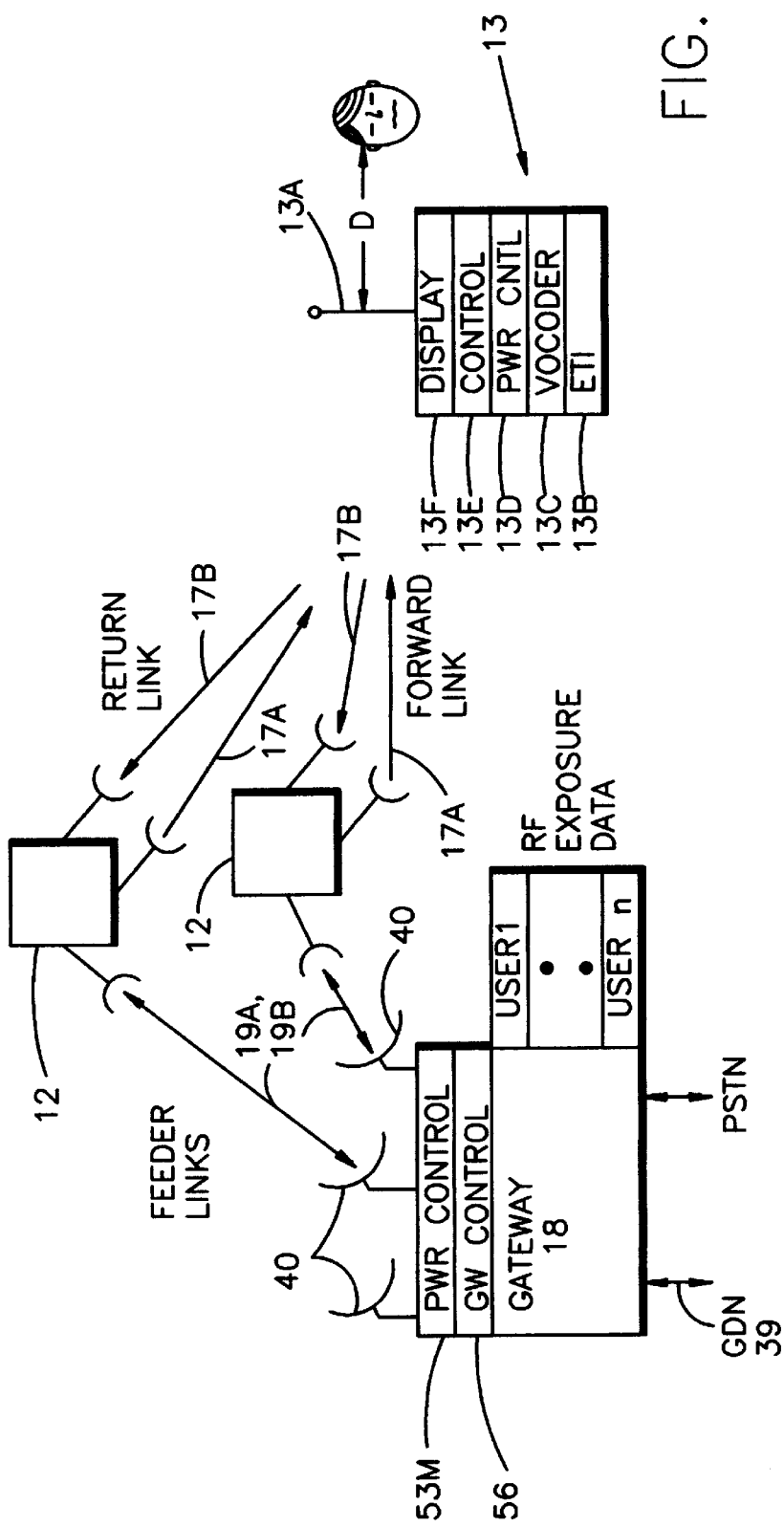
FIG. 6 is a block diagram of the satellite communication system showing the teaching of this invention in greater detail.

Reference is made to FIG. 6 for illustrating a simplified block diagram of the satellite communications system 10 of FIG. 1. The user terminal 13 includes an Electronic Terminal Identifier (ETI) 13b that uniquely identifies the terminal, including a terminal type (e.g., vehicle, fixed, handheld, voice only, voice/data, data, etc.). The user terminal 13 typically includes a variable rate (1200, 2400, 4800, 9600 baud) vocoder 13c for digitizing a user's speech and for converting input vocoded speech to an analog format. The user terminal 13 also includes a closed loop transmitter power control function 13d that may be similar to that specified in the before-mentioned TIA/EIA Interim Standard, "Mobile Station-Base Station Compatibility Standard for Dual-Mode Wideband Spread Spectrum Cellular System" TIA/EIA/IS-95, July 1993. The antenna 13a bidirectionally couples the user terminal 13 to one or more of the low earth orbit (LEO) satellites 12.

As was previously described in reference to FIG. 3A, in this embodiment of the invention the satellites 12 are bent pipe repeaters that receive user transmissions from one of 16 beams on the return link 17b, frequency translate same, and transmit the user signal to a GW 18 on link 19b. The satellites 12 also receive a feeder link 19a from the GW, frequency translate same, and transmit a signal to the user terminal through the same one of the 16 beams on the forward link 17a.

The GW 18 is responsible for assigning channels and Walsh codes to user terminals and for controlling the transmitter power of the user terminals during a call. The user terminal transmitter power is controlled in discrete fractional increments of a dB by sensing the user terminal's signal on the return link, and by adjusting the transmitter power of the user terminal with power control bits sent periodically over the forward link. This typically occurs on a per vocoder frame basis, or every 20 milliseconds (50 times per second) in the presently preferred embodiment of the satellite communications system 10.

As was indicated above, the transmitter power level of the user terminal 13 is always known to the GW 18 as the GW 18 is continuously controlling, with the power control bits, the user terminal power level at the frame rate. An initial user terminal power level is known to the GW 18 at the time the connection is first set up, and subsequent user terminal power adjustments are made from the initial level.

Figure 7:
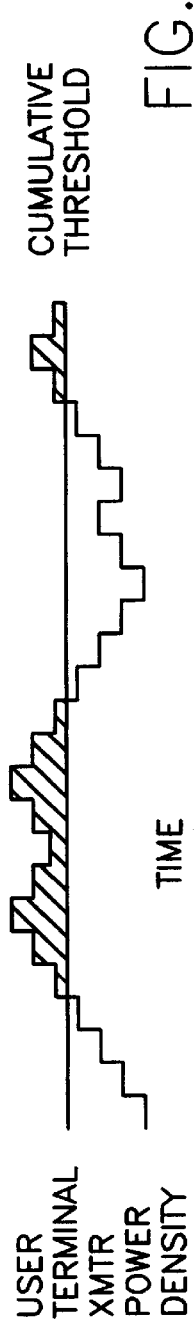
FIG. 7 is a graph illustrating an exemplary user terminal transmitter power density as determined at the gateway.

In accordance with this invention the GW 18 monitors the power radiated from the omnidirectional antenna of the user terminal (as received through the return link), converts the radiated power to a power flux density at the user's body (based on some distance d between the antenna 13a and the user's body), records the magnitude of any power flux density that exceeds a predetermined threshold limit (shown cross-hatched in the graph of FIG. 7), and averages the recorded magnitude over time.

One suitable expression for determining the power flux density (PFD) at the user's body is as follows:

$$PFD = EIRP/4\pi d^2,$$

wherein EIRP represents the effective isotropic radiated power (in milliwatts) in the direction of the user's body, and d is the distance between the radiating device (i.e., the antenna 13a) the user's body in centimeters.

If it becomes apparent that the averaged total power density is approaching the specified maximum allowable exposure (e.g., 4 mw/cm$^2$ at distance d), the GW 18 sends a message on the forward link to an embedded controller 13e of the user terminal 13. In response to receiving this message the controller 13e can display a message to the user on a terminal display 13f, the displayed message indicating that the call in progress will soon be terminated. Alternatively, an audible warning tone can be given to the user. The displayed message and/or tone is preferably given at a time that will enable the user to complete the call before the call is terminated. If the user terminal 13 is still connected at a time at which the maximum allowable exposure is about to be exceeded, the GW 18 automatically terminates the connection.

In general, the GW 18 determines if an averaged transmitted power density associated with the antenna 13a of the user terminal 13 will equal or exceed at least one of a predetermined threshold level, within a specified period of time, or an absolute threshold level. If the GW 18 determines that a threshold will probably be exceeded if the call connection is maintained, the GW 18 terminates the connection prior to a time that the user terminal averaged transmitted power density level equals or exceeds the predetermined or absolute threshold level.

It is also within the scope of the invention for the GW 18 to cause the transmitted power of the user terminal 13 to be reduced as the terminal approaches the threshold level, so as to maximize the time before the terminal 13 is disconnected. In this regard the diversity level (i.e., number of satellites 12) can also be varied so as to maintain an adequate return link quality.

Further in accordance with this invention, if the user terminal 13 attempts to reconnect to the system 10 within some predetermined period of time after termination, the GW 18 refuses to connect the user terminal 13. As more time expires the user terminal 13 is permitted to reconnect, as the maximum allowable exposure limit is specified over an interval of time (e.g., one half hour).

The user exposure information is determined and accumulated by the gateway controller 56 (FIG. 2) for each user terminal 13 that is managed by the GW 18. The exposure information can also be accumulated over a number of calls. For example, a user placing a number of short calls within a predetermined period of time may be exposed to approximately the same RF energy as a user placing one call during the same period of time.

In that the GW 18 is aware of the type of user terminal from the ETI that is transmitted over the return link at call set-up, certain types of user terminals may not be monitored. For example, it may be assumed that a fixed user terminal 14a will have its antenna 13a placed a considerable distance from the user. Also, for vehicle mounted terminals the antenna 13a may be on the exterior of the vehicle 15 (FIG. 1), thereby shielding the user from the transmitted RF energy. Thus, based on the ETI the GW 18 is enabled to discriminate those types of user terminals that present the highest probability of user exposure to the radiated RF energy (such as handheld terminals). Furthermore, different types of handheld terminals (also identifiable from the ETI) may have different placements of the antenna 13a relative to the user's body when held by the user in a normal operating position. As such, the value of the distance (d) used in computing the user exposure may differ for different types of user terminals 13, thereby influencing the computation of the averaged RF power density by the GW 18. The threshold level of interest may be fixed or may be variable.

It is within the scope of the invention to have the user terminal 13 also monitor the transmitted power of the user terminal 13 based on, by example, the power control information received on the forward link from the GW 18. The results of the user terminal power monitoring may be sent over the return link to the GW 18 to be used in conjunction with the results of the GW 18 power monitoring. Majority voting or some other technique can be used in the GW 18 when making a decision to terminate a connection with a particular user terminal 13. Preferably, the averaged power density that is determined by the GW 18 has priority over any measurements sent from the user terminal 13.

It is also preferred to enable a user terminal to override a GW-initiated cut-off of service when placing predetermined types of calls, such as emergency calls (e.g., a 911 call). In this case the GW 18 determines from the telephone number sent with the call connection request that one of a set of predetermined numbers has been dialed by the user, and connects the call through to the PSTN.

After connecting a user making one of the predetermined types of calls, the GW 18 can send a message to the user terminal 13 that causes the terminal to display a message (and/or sound an audible tone) to indicate to the user that the call connection was completed, even though the user terminal has been determined by the GW 18 to have exceeded the averaged power density threshold level.

It is also within the scope of this invention to maintain a log of user RF exposure-related data and a record of any calls that are connected during a time that the user terminal is determined to be over-threshold (e.g., emergency calls), and to periodically transfer this information from the GW 18 to the GOCC 36 via the GDN 39. The GOCC 36 can archive this data and/or use the data for statistical purposes.

While the invention has been particularly shown and described with respect to preferred embodiments thereof, it will be understood by those skilled in the art that changes in form and details may be made therein without departing from the scope and spirit of the invention.

For example, it should be apparent to those skilled in the art that the teaching of this invention is not limited to satellite communication systems, and is also not limited to spread spectrum communication systems. By example, time division multiple access (TDMA) systems can also benefit from the teaching of this invention. The teaching of this invention is thus applicable to wireless communications systems in general, wherein a gateway, base station, mobile switching center, and the like are enabled to remotely determine a user's exposure to RF energy, and to temporarily refuse or limit service to a user based on the determined exposure.

It should further be appreciated that in some types of satellite communications systems, such as systems wherein the satellite is capable of performing on-board processing for communication links, the satellite itself may perform all or a portion of the user terminal radiated power monitoring functions as described above.

What is claimed is:

1. A satellite communication system, comprising:
   a plurality of non-geosynchronous earth orbiting satellites;
   at least one terrestrially located user transceiver; and
   at least one terrestrially located gateway, said gateway comprising circuitry for establishing and maintaining a bidirectional RF code division multiple access (CDMA) communication connection between a terrestrial communications system and said at least one user transceiver through at least one of said plurality of satellites, said gateway further comprising a processor for receiving call requests for the user transceiver and for connecting the user transceiver to the terrestrial communications system so as to make and receive calls, said gateway further comprising an RF exposure controller for estimating, within an interval of time, an RF exposure of a user associated with the user transceiver, said at least one gateway further comprising a power controller for controlling the transmitter power of said user transceiver in accordance with the estimated RF exposure of the user so as to cause the transmitter power of said user transceiver to be reduced if a threshold RF exposure level is equaled or exceeded.

2. A satellite communications system, comprising:
   a plurality of non-geosynchronous earth orbiting satellites;
   at least one terrestrially located user transceiver; and
   at least one terrestrially located gateway, said gateway comprising circuitry for establishing and maintaining a bidirectional RF code division multiple access (CDMA) communication connection between a terrestrial communications system and said at least one user transceiver through at least one of said plurality of satellites, said gateway further comprising a processor for receiving call requests for the user transceiver and for connecting the user transceiver to the terrestrial communications system so as to make and receive calls, said gateway further comprising an RF exposure controller for estimating, within an interval of time, an RF exposure of a user associated with the user transceiver, said at least one gateway further comprising a power controller for controlling the transmitter power of said user transceiver in accordance with the estimated RF exposure of the user so as to cause the transmitter power of said user transceiver to be reduced if a threshold RF exposure level is equaled or exceeded, wherein said RF exposure controller is responsive to a reduction in the user transceiver transmitter power for increasing a satellite diversity level that is assigned to the user transceiver.

3. A method for operating a communications system, comprising the steps of:
   establishing an RF connection with a user terminal through a forward link and a return link that are coupled through at least one satellite;
   estimating at a gateway, during the connection, if an averaged transmitted RF power density associated with an antenna of the user terminal will equal or exceed, relative to a user of the terminal, at least one of a predetermined threshold level, within a specified unit of time, or an absolute threshold level; and
   terminating the connection prior to a time that the estimated averaged transmitted power density level equals or exceeds the threshold level.

4. A method as in claim 3, and further comprising the step of:
   in response to the user terminal attempting to establish a second connection within an interval of time after executing the step of terminating, refusing to establish the second connection.

5. A method as in claim 3, and further comprising the steps of:
   in response to the user terminal attempting to establish a second connection within an interval of time after executing the step of terminating, comparing a telephone number sent with a connection request with telephone numbers belonging to a predetermined set of telephone numbers, and
   if the telephone number matches one of the telephone numbers of the set, connecting the user terminal for placing the call to the telephone number.

6. A method for operating a communications system, comprising the steps of:
   establishing an RF connection with a user terminal through a forward link and a return link that are coupled through at least one satellite;
   estimating at a gateway, during the connection, if an averaged transmitted RF power density associated with an antenna of the user terminal will equal or exceed, relative to a user of the terminal, at least one of a predetermined threshold level, within a specified unit of time, or an absolute threshold level; and
   terminating the connection prior to a time that the estimated averaged transmitted power density level equals or exceeds the threshold level, wherein the step of estimating comprises the steps of:
   sampling a signal received from the user terminal over the return link;

transmitting a power control signal to the user terminal over the forward link to establish the transmitter power of the user terminal at a predetermined level; and converting an expected transmitter power of the user terminal to a power density value relative to the user's body.

7. A method for operating a communications system, comprising the steps of:

establishing an RF connection with a user terminal through a forward link and a return link that are coupled through at least one satellite;

estimating at a gateway, during the connection, if an averaged transmitted RF power density associated with an antenna of the user terminal will equal or exceed, relative to a user of the terminal, at least one of a predetermined threshold level, within a specified unit of time, or an absolute threshold level; and terminating the connection prior to a time that the estimated averaged transmitted power density level equals or exceeds the threshold level, wherein the step of establishing comprises the steps of:

identifying at the gateway, from information received from the user terminal over the return link, a type of user terminal; and executing the step of estimating only if the user terminal type is identified to be one of a predetermined one or more types.

* * * * *